United States Patent
Singh et al.

(10) Patent No.: US 6,479,610 B1
(45) Date of Patent: Nov. 12, 2002

(54) POLYFUNCTIONAL FLUOROSILICONE COMPOSITION, METHOD FOR MAKING, AND USE

(75) Inventors: Navjot Singh, Clifton Park, NY (US); John Thomas Leman, Niskayuna, NY (US); John M. Whitney, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/627,911

(22) Filed: Jul. 27, 2000

(51) Int. Cl.⁷ .................... C08G 77/08; C08G 77/24
(52) U.S. Cl. ................... 528/18; 528/42; 524/431; 524/588
(58) Field of Search .................. 528/42, 18; 524/43, 524/588

(56) References Cited

U.S. PATENT DOCUMENTS 5,236,997 A    8/1993  Fujiki .................... 524/731
5,300,239 A  * 4/1994  Ozaki et al. ............ 252/86

* cited by examiner

*Primary Examiner*—Margaret G. Moore
(74) *Attorney, Agent, or Firm*—Toan P. Vo; Noreen C. Johnson

(57) ABSTRACT

A fluorosilicone crosslinker and method for making is provided. Reaction is effected between a silanol terminated polyfluoroalkyl silicone fluid and a polyalkoxysilane in the presence of a Platinum Group Metal catalyst. The fluorosilicone crosslinker can be used in combination with a silanol terminated fluoroalkyl substituted polydiorganosiloxane to formulate a neutral, condensation curable, solvent resistant sealant.

20 Claims, No Drawings

POLYFUNCTIONAL FLUOROSILICONE COMPOSITION, METHOD FOR MAKING, AND USE

The present invention is based on work sponsored under NASA's High Speed Research Contract NAS1 20220, with Boeing under subcontract ZA0073 Task 22, Subtask 4.2.2.4.

BACKGROUND OF THE INVENTION

The present invention is directed to fluorosilicone cross-linkers and their use in room temperature condensation curable organo(fluoro)polysiloxane compositions useful in the preparation of solvent resistant sealants.

Since the early 1950's when integral fuel tanks became a common structural feature of aircraft, fuel resistant sealing materials, such as polysulfide polymers, were used to contain the fuel. Initially, polysulfide polymers were employed because of their excellent fuel resistance. In addition to fuel resistance, elongation, flexibility, and tensile strength are additional properties needed in a fuel tank sealant. For example, upon cure, a typical fuel tank sealant may show at room temperature, typical values in a range between about 250 and about 300 elongation (%), a tensile strength (psi) of about 150, and a 100% modulus (psi) in a range between about 50 and about 100. An evaluation of available fuel resistant sealants showed that fluorinated organopolysiloxane polymers possess many desirable properties. However, commercially available fluorosilicone sealants are often based on a one-package moisture curable acetoxy cure system which results in the generation of corrosive volatiles, such as acetic acid.

A fluorosilicone composition having a neutral condensation cure system is shown by Fujiki, U.S. Pat. No. 5,236,997, who employs a fluorine containing polydiorganosiloxane base polymer having a reduced level of silicon bonded, fluorine containing substituent groups in the terminal position. Fujiki resorts to the synthesis of a special fluorosilicone base polymer substantially free of bulky fluorine containing organic groups in the terminal positions. The resulting chain-end modification to make curable polymers requires an additional step in the process. In addition, any reduction in the fluorine level in the base polymer typically results in a decrease in fuel resistance performance.

With the need for fuel tank sealants which do not corrode, neutral condensation cure systems for commercially available silanol terminated fluorine containing polydiorganosiloxane base polymers which do not require any alteration in the fluorine content are constantly being sought.

BRIEF SUMMARY OF THE INVENTION

The present invention provides a neutral, room temperature condensation curable, fluorosilicone sealant composition comprising:

(A) a silanol terminated fluoroalkyl substituted polydiorganosiloxane, (B) an oligomeric fluorosilicone crosslinker, (C) filler, and (D) an effective amount of a condensation catalyst, A further embodiment of the present invention provides an oligomeric fluorosilicone crosslinker of the formula, $$(R^2O)_m(R)_nSiO-[R(R^1)SiO]_x-Si(R)_n(OR^2)_m,\qquad(2)$$

where R is a $C_{(1-12)}$ organo radical, $R^1$ is a $C_{(3-8)}$ fluoroalkyl radical, $R^2$ is a $C_{(1-12)}$ alkyl radical, "m" is an integer having a value of 2 or 3, "n" is an integer having a value of 0 or 1, and the sum of "m+n" is equal to 3, and "x" is an integer in a range between about 3 and about 30 inclusive.

A further embodiment of the present invention provides a method for making an oligomeric fluorosilicone crosslinker having terminal polyalkoxysiloxy units which comprises effecting reaction between a silanol terminated polyfluoroalkylsilicone fluid and a polyalkoxysilane in the presence of an effective amount of a Platinum Group Metal catalyst.

DETAILED DESCRIPTION OF THE INVENTION

In preparing the neutral, room temperature condensation curable, solvent resistant sealant compositions of the present invention, it is preferred to initially prepare a "paste" in the form of a substantially uniform blend of a filler and a silanol terminated fluoroalkyl substituted polydiorganosiloxane. "Neutral" as used herein refers to a sealant composition which is substantially acid-free and substantially base-free. Additional components, such as a heat stabilizer can be added. Any number of methods for blending said components known in the art may be utilized, such as batchwise shearing in a double planetary, change-can type mixer. Preferably, the paste is prepared in a continuous fashion on a devolatilizing, counter-rotating, non-intermeshing twin screw extruder, as taught in U.S. Pat. No. 4,528,324, U.S. Pat. No. 5,354,833, and U.S. Pat. No. 5,514,749. Blending of the ingredients is typically carried out using external heating at temperatures in a range between about 50° C. and about 200° C., preferably in a range between about 100° C. and about 150° C. A vacuum also can be used on the paste to degas, deaerate, or combinations thereof to achieve a substantially uniform blend.

Commercially available silanol terminated fluoroalkyl substituted polydiorganosiloxanes having a viscosity at about 25° C. in a range between about $6\times10^4$ centipoise and about $1.6\times10^5$ centipoise can be used in the practice of the invention to make the neutral, room temperature condensation curable, solvent resistant sealant compositions. While the silanol terminated fluoroalkyl substituted polydiorganosiloxanes preferably include chemically combined trifluoropropylmethylsiloxy units, other alkylfluoroalkylsiloxy units also can be present, such as different $C_{(1-12)}$ alkyl radicals, for example, radicals, such as methyl, ethyl, propyl, and butyl and phenyl, and other $C_{(3-8)}$ fluoroalkyl units. The silanol terminated fluoroalkyl substituted polydiorganosiloxane comprises organofluorosiloxy units of formula (1), $$R(R^1)SiO-,\qquad(1)$$

where R is a $C_{(1-12)}$ organic radical, and $R^1$ is a $C_{(3-8)}$ polyfluoroalkyl radical. The silanol terminated fluoroalkyl substituted polydiorganosiloxane is typically present at about 80 parts per 100 parts by weight of the total sealant composition.

Some of the condensation catalysts which can be used in the neutral condensation curable room temperature fluorosilicone sealant compositions of the present invention, include but are not limited to, dibutyltin diacetate, dimethyltin neodecanoate, dibutyltin dilaurate, stannous octoate, dimethyltin hydroxyoleate, or combinations thereof. An effective amount of the condensation catalyst is in a range between about 0.1 part and about 5.0 parts by weight per 100 parts by weight of sealant composition, and preferably in a range between about 0.1 part and about 1.0 parts by weight per 100 parts by weight of sealant composition.

While fumed silica is preferably used in the sealant composition as a reinforcing filler, extending fillers, such as diatomaceous earth, precipitated silica, ground quartz, and calcium carbonate, also can be employed in particular instances. It is preferred to use fumed silica which has been pretreated with an effective amount of a cyclic siloxane, such as octamethylcyclotetrasiloxane, or a mixture thereof with an organosilazane, such as hexamethyldisilazane. There can be used in a range between about 0 parts and about 30 parts by weight of filler per 100 parts of the silanol terminated fluoroalkyl substituted polydiorganosiloxane and preferably, in a range between about S parts and about 15 parts by weight of filler per 100 parts of the silanol terminated fluoroalkyl substituted polydiorganosiloxane. In addition to reinforcing or extending fillers, heat stabilizers such as iron oxide, ceric oxide, and titanium dioxide, also can be employed in a range between about 0.1 parts and about 10 parts by weight per 100 parts by weight of the silanol terminated fluoroalkyl substituted polydiorganosiloxane.

The neutral room temperature condensation curable fluorosilicone sealant composition is prepared by blending the oligomeric fluorosilicone cross-linkers, shown by the following formula:

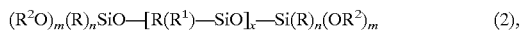

$$(R^2O)_m(R)_nSiO\text{—}[R(R^1)\text{—}SiO]_x\text{—}Si(R)_n(OR^2)_m \quad (2),$$

which have terminal polyalkoxysiloxy units in combination with the above-described paste. The oligomeric fluorosilicone cross-linker is typically present in a range between about 1 part and about 20 parts by weight per 100 parts by weight of the silanol terminated fluoroalkyl substituted polydiorganosiloxane.

As shown within formula (2), R is a $C_{(1-12)}$ organo radical, $R^1$ is a $C_{(3-8)}$ polyfluoroalkyl radical, $R^2$ is a $C_{(6-12)}$ alkyl radical, "m" is an integer having a value of 2 or 3, "n" is an integer having a value of 0 or 1, and the sum of "m+n" is equal to 3, and "x" is an integer having a value in a range between about 3 and about 30 inclusive. Radicals included within R are for example, $C_{(1-12)}$ alkyl radicals, such as, methyl, ethyl, propyl, butyl; $C_{(6-12)}$ aryl radicals and halo aryl radicals such as phenyl tolyl, xylyl, chlorophenyl, and naphthyl. Radicals included within $R^2$ are for example methyl, ethyl, propyl and butyl. Preferably, R is methyl, $R^1$ is trifluoropropyl, and $R^2$ is ethyl.

The neutral, room temperature condensation curable, solvent resistant sealant composition is prepared by blending the desired crosslinker with the paste described above, within the aforedescribed proportions. An effective amount of a condensation curing catalyst is typically incorporated into the resulting blend as a separate component at the time of use to afford a room temperature vulcanizing rubber. Alternatively, both the crosslinker and condensation curing catalyst may be kept separate from the polydiorganosiloxane-filler paste until curing of the composition is desired, at which time these components, either separately or together are mixed with the paste to afford a room temperature vulcanizing rubber.

The oligomeric fluorosilicone cross-linker of formula (2), having terminal alkoxysiloxy units can be made by effecting contact in substantially anhydrous conditions at a temperature in a range between about −10° C. and about 150° C, preferably in a range between about 10° C. and about 40° C., between a silanol terminated fluoroalkyl substituted polydiorganosiloxane of formula (3)

$$HO\text{—}[R(R^1)SiO]_x\text{—}OH, \quad (3)$$

having a viscosity in a range between about 40 centipoise and about 200 centipoise at about 25° C., and a polyalkoxysilane of formula (4),

$$HSi(R)_n(OR^2)_m, \quad (4)$$

in the presence of an effective amount of a Platinum Group Metal catalyst, or "PGM catalyst" where x, n, m, R, $R^1$, and $R^2$ are as previously defined. Reaction is typically carried out until cessation of gas evolution. Preferably, the polydiorganosiloxane includes chemically combined [trifluoropropyl(methyl)silyloxy] units.

Among the polyalkoxysilanes of formula (4), there are preferably included triethoxysilane, trimethoxysilane, methyldiethoxysilane, methyldimethoxysilane, or combinations thereof.

While the PGM catalyst used in the practice of the invention to synthesize the cross-linker is preferably platinum, the PGM catalyst also can include compounds of ruthenium, osmium, iridium, palladium, cobalt, rhodium and nickel. In forming the cross-linker, an effective amount of the PGM catalyst is in a range between about 10 parts per million (ppm) and about $10^3$ parts per million of PGM, per part of reaction mixture.

Among the PGM catalysts which can be used, include a platinum catalyst as shown by Karstedt, U.S. Pat. No. 3,775,452, which is formed by reacting chloroplatinic acid with tetramethyldivinyldisiloxane in the presence of sodium bicarbonate in ethanol. Further examples are shown by Lamoreaux, U.S. Pat. No. 3,220,972 directed to reaction products of chloroplatinic acid and alcohols, ethers, aldehydes, and mixtures thereof and reaction products of an olefin and chloroplatinic acid, as shown in Ashby, U.S. Pat. No. 3,159,601, or the reaction product of platinic chloride and cyclopropane as described in Ashby, U.S. Pat. No. 3,159,662. Preferably, the PGM catalyst is a heterogeneous platinum/carbon catalyst or palladium/carbon catalyst.

The crosslinker in the present invention can be employed in non-corrosive cure systems to fabricate elastomers useful as fuel resistant sealing materials, electronic encapsulation, and in applications requiring chemically resistant materials. Particularly, the crosslinkers can be used for preparation of fuel tank sealants.

In order that those skilled in the art will be better able to practice the present invention, the following examples are presented by way of illustration and not by way of limitation. All parts shown are by weight unless otherwise indicated.

EXAMPLE 1

There was added in one portion under a nitrogen atmosphere at room temperature, 200 milligrams (mg) of 10 weight % of palladium/carbon to a mechanically stirred mixture of 20 grams (g) of a silanol terminated polyfluoroalkyl silicone fluid having a viscosity in a range between about 40 centipoise and about 200 centipoise and chemically combined trifluoropropylmethylsiloxy units, 13.6 milliliters (ml) of methyldiethoxysilane, 21 ml of tetrahydrofuran, and 21 ml of triethylamine. Vigorous hydrogen evolution was observed as the reaction warmed to 50° C.

After stirring the mixture for 10 hours, it was filtered to remove the palladium/carbon catalyst. The mixture was then stripped of volatile components under reduced pressure. There was obtained 22.3 g of a yellow fluid. Based on method of preparation, the yellow fluid was a low molecular weight oligomeric fluorosilicone cross-linker in the form of an oligomer having terminal methyl(diethoxy)silyl groups. Product identity was further confirmed with Fourier Transform Infrared Spectroscopy (FTIR) which showed the disappearance of the silanol functional group. Additional confirmation was shown by $^1$H-nuclear magnetic resonance spectroscopy (NMR), $^{13}$C-NMR and gas chromatography-mass spectrometry (GCMS) which showed spectral features consistent with the desired end-capped fluorosilicone oligomer within the scope of formula (2).

EXAMPLE 2

There was added in one portion under a nitrogen atmosphere at room temperature, 200 mg of 10 weight % of palladium/carbon to a mechanically stirred mixture of 20 ml of triethoxysilane, 20 g of a silanol terminated polyfluoroalkylsilicone fluid within the scope of formula (3) which included chemically combined trifluoropropylmethylsiloxy units, 100 ml of tetrahydrofuran, and 10 ml of triethylamine. Hydrogen evolution occurred immediately upon addition of the palladium/carbon catalyst. The reaction mixture was stirred for 4 hours until gas evolution ceased.

The reaction mixture was filtered and stripped of volatile components under reduced pressure. There was obtained 31.04 g of a clear colorless liquid. Based on method of preparation, and confirmation by $^1$H-NMR and FTIR spectroscopy, showing the disappearance of silanol functional groups and the presence of (triethoxy)silyl endgroups, the product was a low molecular weight (triethoxy)siloxy terminated fluorosilicone oligomer within the scope of formula (2).

EXAMPLE 3

A sealant composition was prepared in a SemKit® Mixer of PRC Desoto Inc of Mt. Laurel, N.J. Initially, a paste was prepared in a continuous fashion on a devolatizing, counter-rotating, non-intermeshing twin screw extruder. The paste included 100 parts of a silanol terminated polyfluoroalkyl silicone fluid having a viscosity in a range between about 40 centipoise and about 200 centipoise and chemically combined trifluoropropylmethylsiloxy units, 9.2 parts by weight of fumed silica treated with octamethylcyclotetrasiloxane, and 5.7 parts by weight iron oxide.

Oligomeric fluorosilicone crosslinker of Example 1 (8 parts by weight) and 0.5 parts by weight of dibutyltin diacetate were-added to 100 parts paste and the sealant was dispensed from a Semco® tube of PRC Desoto Inc, into an open mold and cured as thin sheets at room temperature and 50% relative humidity (RH) for one week. Tensile bar specimens were cut from the cured sheets and the physical properties are shown as follows (Jet A is commercial aircraft fuel):

| Test Conditions | Elongation (%) | Tensile Strength (psi) | Modulus at 100% Strain (psi) |
| --- | --- | --- | --- |
| As cured | 162 | 292 | 54 |
| Heat aged in air (7 days 200° C.) | 113 | 295 | 45 |
| Immersion in Jet A (7 days 60° C.) | 144 | 219 | 65 |
| Immersion in Jet A (2 days 60° C.) + Heat aged in air (5 days 177° C.) | 158 | 238 | 67 |

The above results show that even after rigorous test conditions, the fluorosilicone rubber test bar specimens made from the sealant composition of the present invention substantially retain many of their original physical characteristics.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed is:

1. A neutral, room temperature condensation curable, fluorosilicone sealant composition comprising:
   (A) a silanol terminated fluoroalkyl substituted polydiorganosiloxane, wherein fluoroalkyl substituent groups are $C_{(3-5)}$ polyfluoroalkyl groups;
   (B) an oligomeric fluorosilicone crosslinker;
   (C) a filler; and
   (D) an effective amount of a condensation catalyst.

2. The sealant composition in accordance with claim 1, wherein the polydiorganosiloxane is present at about 80 parts per 100 parts by weight of the sealant composition.

3. The sealant composition in accordance with claim 1, where the polydiorganosiloxane comprises organofluorosiloxy units of the formula $$R(R^1)SiO\!\!-\!\!,$$

where R is a $C_{(1-12)}$ organic radical, and $R^1$ is a $C_{(3-5)}$ polyfluoroalkyl radical.

4. A neutral, room temperature condensation curable, fluorosilicone sealant composition comprising:
   (A) a silanol terminated fluoroalkyl substituted polydiorganosiloxane which comprises organofluorosiloxy units of the formula $$R(R^1)SiO\!\!-\!\! \qquad (1);$$

where R is a $C_{(1-12)}$ organic radical, $R^1$ is a $C_{(3-8)}$ polyfluoroalkyl radical, and at least one of R and $R^1$ comprises trifluoropropyl(methyl) units;
   (B) an oligomeric fluorosilicone crosslinker;
   (C) a filler; and
   (D) an effective amount of a condensation catalyst.

5. A neutral, room temperature condensation curable, fluorosilicone sealant composition comprising:
   (A) a silanol terminated fluoroalkyl substituted polydiorganosiloxane;
   (B) an oligomeric fluorosilicone crosslinker which comprises a material having a formula $$(R^2O)_m(R)_nSiO\!\!-\!\![R(R^1)SiO]_x\!\!-\!\!Si(R)_n(OR^2)_m$$

where R is a $C_{(1-12)}$ organo radical, $R^1$ is a $C_{(3-8)}$ fluoroalkyl radical, $R^2$ is a $C_{(1-12)}$ alkyl radical, "m" is an integer having a value of 2 or 3, "n" is an integer having a value in a range between about 3 and about 30 inclusive;
   (C) a filler; and
   (D) an effective amount of a condensation catalyst.

6. The sealant composition in accordance with claim 5, where the crosslinker comprises a dimethoxymethylsilyl terminated methyltrifluoropropyl-siloxane fluid.

7. The sealant composition in accordance with claim 5, where the crosslinker is present in a range between about 1 part and about 20 parts by weight per 100 parts of the silanol terminated fluoroalkyl substituted polydiorganosiloxane.

8. The sealant composition in accordance with claim 1, where the condensation catalyst comprises an organometallic compound.

9. The sealant composition in accordance with claim 8, where the organometallic compound comprises dibutyltin diacetate, dimethyltin neodecanoate, dibutyltin dilaurate, stannous octoate, dimethyltin hydroxyoleate, or combinations thereof.

10. The sealant composition in accordance with claim 9, where the organometallic compound comprises dibutyltin diacetate.

11. The sealant composition in accordance with claim 1, where the condensation catalyst is present in a range between about 0.1 parts and about 5.0 parts by weight per 100 parts of the of sealant composition.

12. The sealant composition in accordance with claim 11, where the condensation catalyst is present in a range between about 0.1 parts and about 1.0 parts by weight per 100 parts of the sealant composition.

13. The sealant composition in accordance with claim 1, where the filler comprises fumed silica.

14. A neutral, room temperature condensation curable, fluorosilicone sealant composition comprising:
  (A) a silanol terminated $C_{(3-5)}$ polyflouroalkyl substituted polydiorganosiloxane;
  (B) an oligomeric fluorosilicone crosslinker;
  (C) a filler; and
  (D) an effective amount of a condensation catalyst;
  wherein the filler is present in an amount up to about 30 parts by weight per 100 parts of the silanol terminated fluoroalkyl substituted polydiorganosiloxane.

15. The sealant in accordance with claim 14, where the filler is present in a range between about 5 parts and about 15 parts by weight per 100 parts of the silanol terminated fluoroalkyl substituted polydiorganosiloxane.

16. A neutral, room temperature condensation curable, fluorosilicone sealant composition comprising:
  (A) a silano terminated fluoroalkyl substituted polyorganosiloxane, wherein fluoroalkyl substituent groups are $C_{(3-5)}$ polyfluoroalkyl groups;
  (B) an oligomeric fluorosilicone crosslinker;
  (C) a filler;
  (D) an effective amount of a condensation catalyst; and
  (E) a heat stabilizer.

17. The sealant composition in accordance with claim 16, where the heat stabilizer comprises iron oxide, ceric oxide, titanium dioxide, or combinations thereof.

18. The sealant composition in accordance with claim 17, where the heat stabilizer comprises iron oxide.

19. The sealant composition in accordance with claim 16, wherein said heat stabilizer is present in a range between about 0.1 parts and about 10 parts by weight per 100 parts of the silanol terminated fluoroalkyl substituted polydiorganosiloxane.

20. A neutral, room temperature condensation curable, fluorosilicone sealant composition comprising by weight:
  (A) a silanol terminated fluoroalkyl substituted polydiorganosiloxane which comprises trifluoropropyl(methyl) siloxy units present at about 80 parts per 100 parts by weight of the sealant composition,
  (B) a diethoxymethylsilyl terminated methyltrifluoropropylsiloxane present in a range between about 1 part and about 20 parts by weight per 100 parts of the silanol terminated fluoroalkyl substituted polydiorganosiloxane,
  (C) fumed silica filler in a range between about 5 parts and about 15 parts by weight per 100 parts of the silanol terminated fluoroalkyl substituted polydiorganosiloxane, and
  (D) dibutyltin diacetate in a range between about 0.1 parts and about 1 parts by weight per 100 parts of the silanol terminated fluoroalkyl substituted polydiorganosiloxane.

* * * * *